Oct. 28, 1941.    W. H. HARRISON    2,260,712
COUPLING DEVICE
Filed July 30, 1938

INVENTOR.
William H. Harrison,
BY Robert W. Fulwider
ATTORNEY.

Patented Oct. 28, 1941

2,260,712

UNITED STATES PATENT OFFICE 2,260,712

COUPLING DEVICE

William H. Harrison, Los Angeles, Calif.

Application July 30, 1938, Serial No. 222,256

5 Claims. (Cl. 285—174)

My invention relates generally to coupling devices and more particularly to means for adjustably and removably coupling an object to a cylinder, the words "cylinder" and "cylindrical" being used herein in a broad sense to include circular and near circular bodies, both solid and hollow.

It is an object of my invention to provide a simple and efficient coupler which will not exert excessive pressure on the cylinder to which it is connected.

It is a further object of my invention to provide a coupling device that can be quickly and easily applied and just as easily removed.

It is also an object of my invention to provide means for coupling an object to a cylinder, whereby more than the usual number of contacting or holding points is provided.

While the device of my invention has numerous applications, I have found that one particularly valuable application thereof is in connection with filter holders, sun shades, and other accessories for cameras, and since the method of operation is essentially the same in each instance, I have illustrated my invention herein as applied to a camera filter holder and a camera sun shade.

Figure 1:
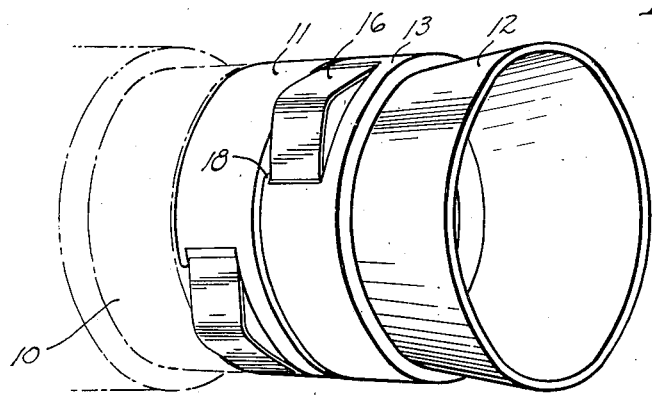
Figure 2:
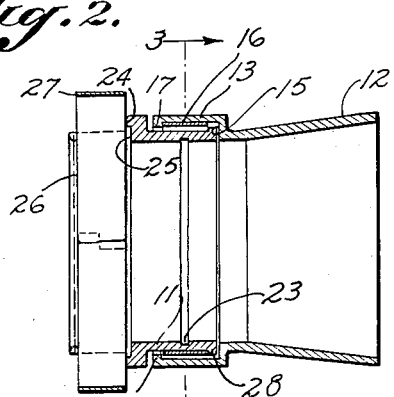
Figure 3:
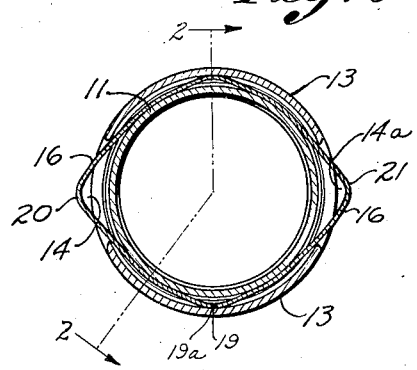
Figure 5:
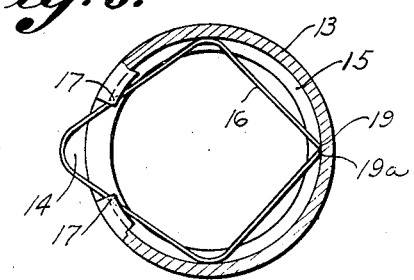
Figure 4:
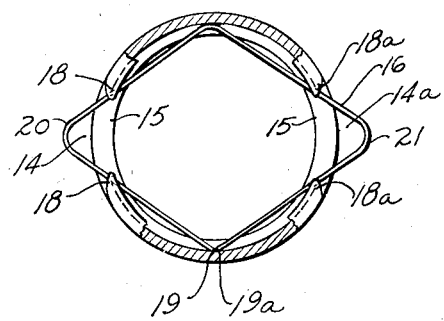
Figure 6:
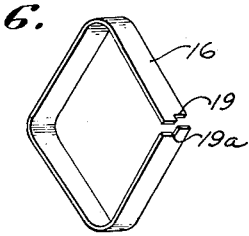

The foregoing and other objects and advantages of my invention will become apparent from the following description of a preferred form thereof, and from the accompanying drawing, in which:

Fig. 1 is a perspective view of a camera lens with both a filter holder and sun shade mounted thereon by the coupling means of my invention, Fig. 2 is a vertical section of the assembly of Fig. 1 minus the lens, and taken as indicated by the line 2—2 in Fig. 3, Fig. 3 is a vertical section taken on the line 3—3 of Fig. 2, Fig. 4 is an end elevation partly in section of the sun shade without the filter holder, showing the spring in normal position, Fig. 5 is an end elevation partly in section of a modified form of my device, and Fig. 6 is a perspective of the spring.

Referring now to the drawing, and particularly to Fig. 1 thereof, the numeral 10 indicates a lens of conventional type used either in still or motion picture cameras. The numeral 11 indicates a filter holder equipped with my coupling means mounted on the lens 10, and the numeral 12 designates a sun shade also equipped with the coupling means of my invention, and mounted on filter holder 11. It will be understood, of course, that the sun shade 12 can be mounted directly on the lens 10 if desired.

Referring now to Figs. 2 and 3, it will be seen that the sun shade 12 is provided with a rearwardly-extending annular portion or collar 13 provided with oppositely-disposed peripheral openings 14 and 14a, each opening representing approximately 40° of arc on the collar. The forward end of collar 13, i. e. the end which merges into the sun shade 12 is shouldered at 15 to provide an abutment for a flat spring 16 to be hereinafter described in detail.

The rear or free end of the collar 13 is provided with a small internal annular flange 17 which is allowed to extend into the openings 14 and 14a a slight distance forming small fingers as illustrated at 18 in Fig. 1, and 18 and 18a in Fig. 4.

As seen from Fig. 6, the spring 16 is preferably made of flat spring steel, formed substantially in the shape of an open polygon of a generally square shape, the two ends of the spring being notched as shown at 19 and 19a in Fig. 6, so as to make a complementary fit and form one corner of the polygon. To assemble the coupler, the spring 16 is slightly deformed and inserted in the collar 13 with its ends 19 and 19a engaging at substantially the midpoint of one of the collar sections between the openings 14 and 14a. The width of the spring 16 is such that it fits between the shoulder 15 and the internal flange 17 without a great deal of play, and its length is such that when assembled in the collar, it assumes a polygonal shape, which in the form shown is substantially a square with two corners of the square extending out through the openings 14 and 14a as seen in Fig. 4. It is to be understood, of course, that when I use the term "polygon" I do not mean that all of the sides must be of equal length. It will be noted that the ends 19 and 19a in their engaged position are held under the flange 17 and that the corner immediately opposite the ends 19 is also held under the flange 17, while the extending corners 20 and 21 of the square which protrude outwardly through the openings 14 and 14a are held by the fingers 18 and 18a respectively, thus preventing the spring from coming out of the collar.

It will be understood that the shoulder 15 and flange 17 perform the same function in the same way, i. e. they provide abutments on either side of the spring 16 to retain it in place, and they are, therefore, interchangeable as desired. Consequently, when in the claims I use the terms "flange" and "shoulder" to denote separate elements, it is merely for the purpose of clarity and the terms are to be considered as equivalents.

When it is desired to mount the coupler on any cylindrical object, the extending spring corners 20 and 21 are pushed inwardly, causing the inner portions of the spring to flex outwardly from their normal position shown in Fig. 4 against the collar 13 to assume a circular position under the flange 17 entirely hidden from view, so that the coupling may be slipped over the cylindrical object in the same manner as though the spring 16 were not present. When the coupling has been slipped over the cylinder, such for instance as the lens 10 or the filter holder 11, the pressure on the corners 20 and 21 of the spring is released and the spring is allowed to flex back toward its normal position, thus bearing tightly against the cylinder at four points of contact as seen in Fig. 3, the amount of deformation and the tightness of the contact depending on the relative size and shape of the cylinder and the coupling.

By this construction, it will be seen that the spring 16 bears equally against four points of the cylinder, so as to give an even and uniform pressure thereagainst, with a minimum amount of strain on the cylinder, as distinguished from the conventional type of couplers wherein pressure is applied at only one or two points on the periphery of the cylinder. It will be apparent that the resistance which the coupling device offers against removal without flexure of the spring 16 will depend upon the strength of the spring and the friction between the spring and the cylinder when nothing else is provided therefor. This is often sufficient when the coupling is only meant to hold its object in a firm position, and is not meant to stand any particular pressure, and sometimes it is a distinct advantage to be able to remove the coupled object, as for instance the sun shade 12, by merely pulling it off and allowing the spring to snap back into normal position.

However, it is sometimes advisable to provide supplemental means of such a nature that when the object is coupled, it will be impossible to remove or uncouple it without again flexing the spring 16 and causing it to resume its circular contour within the collar 13. Likewise, it is sometimes desirable to supply the cylinder with an adapter which provides correlative means for effecting a permanent couple, and sometimes it is desirable to provide such means on the device being coupled, as for instance on the filter holder illustrated in the figures.

Referring again to Fig. 2, numeral 11 indicates the filter holder of Fig. 1 provided with suitable means for holding a filter such as the annular groove 23 on its internal face. The filter holder 11 is supplied with a collar 24 having a shoulder 25 and an internal flange 26 at its rear end, similar to the flange 17, which is adapted to hold a flat spring 27 in position in the manner heretofore described and illustrated in Figs. 3 and 4.

The forward end of the filter holder 11 is provided with an external flange or bead 28, it being noted that in the form shown, the external diameter of the filter holder is such as to allow the sun shade collar 13 to be easily fitted thereon. The bead 28 is of such a diameter that the collar 13 will clear it when the spring 16 is fully compressed, but when the spring is released and assumes or tends to assume its normal position, at least four portions of the spring will bear against the inside vertical face of the bead 28 as seen in Fig. 2, and consequently prevent the sun shade from being removed unless the spring is compressed.

As previously mentioned, it will be understood that the bead 28 is only provided when it is desired to prevent the coupled device from being removed without compressing its spring. Consequently, it will be apparent that the bead 28 may be supplied on the cylinder itself, or it may be supplied by an adapter ring which is permanently secured to the cylinder by set screws or other suitable means, or it may be a part of the coupled device, as illustrated by the filter holder 11, when it is to have another device coupled to it.

In Fig. 5, I have shown a modified form of my device which is basically the same as the first form shown, and is particularly satisfactory where a stiff spring is used. The numeral 13 again designates a collar having a shoulder 15 and an internal flange 17. An opening 14 is provided in the periphery of the collar which is approximately the same size as the opening 14 in the form shown in Figs. 3 and 4, it being noted, however, that but one opening is provided, i. e. the opening 14a of Fig. 4 is not present in Fig. 5. In this case, the spring 16 is formed in the same manner, but is deformed to a slightly different shape from that found in the two opening types of collar, it being noted that due to but one of the corners of the polygon extending outside the collar, the two sides or legs making up the extending corner are slightly longer than the internal legs, whereas in the two-aperture type all of the legs are preferably substantially the same length. However, it will be apparent that in neither case can all of the angles of the polygon be equal as long as the spring is housed in a circular collar.

In the modified form, the ends 19 and 19a are preferably located opposite the single aperture 14 so as to give more uniformity in the action of the spring. However, the operation of this form of my device is the same as the one previously discussed, it being merely necessary to compress the extending corner of the spring to cause it to flex outwardly, so that it can be slipped over the cylinder to which it is to be coupled. This single-corner type of coupler has the advantage of being easier to operate, since with but one corner to compress, the collar opposite the aperture can be grasped with two or more fingers enabling one to hold it steady much more easily.

While I have illustrated my invention as applied to specific apparatus used in conjunction with cameras, it is to be understood of course that it is applicable to other types of apparatus to be attached on cameras or other objects. Likewise, it will be understood that the sizes of the various parts can be varied between relatively wide limits, so long as they are properly proportioned with respect to one another to perform the functions herein stated, and that the specific embodiments of my invention disclosed herein are merely illustrative of my invention which is not to be limited thereto, but is to be afforded the full scope of the appended claims.

I claim as my invention:

1. A coupling device of the character described which includes: a cylindrical collar provided with an aperture in its periphery; a shoulder in one end of said collar and an internal flange in the other end thereof; a polygonal spring disposed within said collar between said shoulder and said flange with its ends free and abutting each other to form one corner of the polygon, and another corner of the polygon extending outwardly through said aperture, said spring and collar being so proportioned that the opposite edges of said spring will normally engage said shoulder and flange respectively at at least five separate points about the polygon, whereby said spring in unflexed position is securely held in its polygonal shape within said collar, but when said extending corner of said spring is pressed inwardly said spring is flexed outwardly to assume a circular shape against the inner surface of said collar, said spring being sufficiently thin so that its internal diameter when flexed is not less than that of the smaller of said flange and shoulder.

2. A coupling device of the character described which includes: a cylindrical collar provided with an aperture in its periphery; a shoulder in one end of said collar and an internal flange in the other end thereof; a polygonal spring disposed within said collar between said shoulder and said flange with its ends free and abutting each other to form one corner of the polygon, and another corner of the polygon extending outwardly through said aperture, said spring and collar being so proportioned that the opposite edges of said spring will normally engage said shoulder and flange respectively at at least five separate points about the polygon, whereby said spring in unflexed position is securely held in its polygonal shape within said collar, but when said extending corner of said spring is pressed inwardly said spring is flexed outwardly to assume a circular shape against the inner surface of said collar, said spring being sufficiently thin so that its internal diameter when flexed is not less than that of the smaller of said flange and shoulder; and an annular portion on one end of said collar provided with an external peripheral bead on its outer edge.

3. A coupling device of the character described which includes: a cylindrical collar provided with an aperture in its periphery; a shoulder in one end of said collar and an internal flange in the other end thereof; a polygonal spring disposed within said collar between said shoulder and said flange with its ends forming one corner of the polygon, and another corner of the polygon extending outwardly through said aperture, said spring and collar being so proportioned that the opposite edges of said spring will normally engage said shoulder and flange respectively at at least five separate points about the polygon, whereby said spring in unflexed position is securely held in its polygonal shape within said collar, but when said extending corner of said spring is pressed inwardly said spring is flexed outwardly to assume a circular shape against the inner surface of said collar, said spring being sufficiently thin so that its internal diameter when flexed is not less than that of the smaller of said flange and shoulder.

4. A coupling device of the character described which includes: a cylindrical collar provided with an aperture in its periphery; a shoulder in one end of said collar and an internal flange in the other end thereof; a polygonal spring disposed within said collar between said shoulder and said flange with its ends free and abutting each other to form one corner of the polygon, and another corner of the polygon extending outwardly through said aperture, whereby said spring in unflexed position is securely held in its polygonal shape within said collar, but when said extending corner of said spring is pressed inwardly said spring is flexed outwardly to assume a circular shape against the inner surface of said collar, said spring being sufficiently thin so that its internal diameter when flexed is not less than that of the smaller of said flange and shoulder.

5. A coupling device of the character described which includes: a cylindrical collar provided with an aperture in its periphery; a shoulder in one end of said collar and an internal flange in the other end thereof; a polygonal spring disposed within said collar between said shoulder and said flange with its ends free and abutting each other to form one corner of the polygon, and another corner of the polygon extending outwardly through said aperture, said spring and collar being so proportioned that the opposite edges of said spring will normally engage said shoulder and flange respectively at at least five separate points about the polygon, whereby said spring in unflexed position is securely held in its polygonal shape within said collar, but when said extending corner of said spring is pressed inwardly said spring is flexed outwardly to assume a circular shape against the inner surface of said collar.

WILLIAM H. HARRISON.